United States Patent
Madhani et al.

(10) Patent No.: US 9,208,551 B2
(45) Date of Patent: Dec. 8, 2015

(54) METHOD AND SYSTEM FOR PROVIDING EFFICIENT FEEDBACK REGARDING CAPTURED OPTICAL IMAGE QUALITY

(71) Applicant: Intuit Inc., Mountain View, CA (US)

(72) Inventors: Sunil Madhani, Mountain View, CA (US); Anu Sreepathy, Bangalore (IN); Samir Kakkar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 122 days.

(21) Appl. No.: 14/012,782

(22) Filed: Aug. 28, 2013

(65) Prior Publication Data

US 2015/0063653 A1    Mar. 5, 2015

(51) Int. Cl.
    *G06T 7/00*    (2006.01)
(52) U.S. Cl.
    CPC .................. *G06T 7/0002* (2013.01)
(58) Field of Classification Search
    None
    See application file for complete search history.

(56) References Cited

U.S. PATENT DOCUMENTS

| | | | |
|---|---|---|---|
| 6,991,158 B2 | 1/2006 | Munte | |
| 8,433,123 B1 * | 4/2013 | Csulits et al. | 382/135 |
| 8,446,652 B2 | 5/2013 | Curtis | |
| 8,478,020 B1 * | 7/2013 | Jones et al. | 382/137 |
| 2004/0076320 A1 * | 4/2004 | Downs, Jr. | 382/139 |
| 2006/0153452 A1 * | 7/2006 | Kjeldsen et al. | 382/176 |
| 2011/0091092 A1 * | 4/2011 | Nepomniachtchi et al. | 382/139 |
| 2011/0313917 A1 * | 12/2011 | Lawson et al. | 705/40 |
| 2011/0313918 A1 * | 12/2011 | Lawson et al. | 705/40 |
| 2013/0004076 A1 * | 1/2013 | Koo et al. | 382/176 |
| 2013/0155474 A1 * | 6/2013 | Roach et al. | 358/505 |
| 2013/0182002 A1 * | 7/2013 | Macciola et al. | 345/589 |

* cited by examiner

*Primary Examiner* — Vu Le
*Assistant Examiner* — Alexander J Lesnick
(74) *Attorney, Agent, or Firm* — Hawley Troxell Ennis & Hawley LLP; Philip McKay

(57) ABSTRACT

An optical image of a source document is captured. Two or more source document image test regions are then defined/determined. An optical image scan is performed on each source document image test region to determine if there are identifiable alpha-numeric characters or symbols present. If one or more of the source document image test regions are determined not to contain identifiable alpha-numeric characters, the captured optical image of the source document is determined to be of insufficient quality to identify and extract individual characters and symbols and it is recommended that optical images of source documents determined to be of insufficient quality to identify and extract individual characters and symbols be re-captured using an image capture device.

19 Claims, 6 Drawing Sheets

| | | | |
|---|---|---|---|
| PO BOX 4005       1<br>ACWORTH, CA 30101-9006 | Manage Your Account & View Your Usage Details | Account Number | Date Due    3 |
| | My Verizon at www.verizonwireless.com | 987654321-00000 | 10/12/12 |
| | | Invoice Number | 1117081942 |

601

605

KEYLINE
/9404338352/

JOHN SMITH
2632 MARINE WAY
MOUNTAIN VIEW, CA 94043

| Quick Bill Summary | Aug 08 – Sep 15 |
|---|---|
| Previous Balance (see back for details) | $100.24 |
| Payment – Thank You | -$100.24 |
| Balance Forward | $.00 |
| Monthly Access Charges | $93.17 |
| Usage Charges | |
|    Voice | $.00 |
|    Messaging | $.00 |
| Verizon Wireless' Surcharges<br>   and Other Charges & Credits | $3.15 |
| Taxes, Governmental Surcharges & Fees | $3.93 |
| Total Current Charges | $100.24 |
| 609   Total Charges Due by October 12, 2012    5 | $100.24 |

| Pay from Wireless | Pay on the Web | Questions: |
|---|---|---|
| #PMT (#768) | My Verizon at www.verizonwireless.com | 1.800.922.0204 or *611 from your wireless |

600

VW

607

JOHN SMITH        4
2632 MARINE WAY
MOUNTAIN VIEW, CA 94043

Due Date     10/12/12
Account Number     987654321-00000

Total Amount Due      $100.24

Due by 10/12/12      $_____.___
                                              Amount Enclosed ☐ Check here and fill out the back
of this slip if your billing address
has changed or you are adding
or changing your email address.

VERIZON WIRELESS     2
PO BOX 660108
DALLAS, TX 75266-0108

METHOD AND SYSTEM FOR PROVIDING EFFICIENT FEEDBACK REGARDING CAPTURED OPTICAL IMAGE QUALITY

BACKGROUND

The widespread availability of optical image capture devices, such as cameras, implemented on, or with, computing systems, such as mobile devices and smart phones, has resulted in a significant number of applications and systems that rely on the ability to extract data from optical images of hard copies of documents in order to obtain various types of information.

For instance, many currently available financial management systems, financial transaction management systems, tax-preparation systems, and various other data management systems, obtain data from optical images of source documents processed using Optical Character Recognition (OCR) systems, or similar data extraction technologies. As a more specific illustrative example, Remote Deposit Capture, (RDC) is currently used with many on-line banking systems.

While the use of optical images and data extraction technology provides some capability to obtain information with minimal user input, there are several issues associated with these methods. One long-standing problem associated with using optical images and data extraction technology to obtain data is related to the fact that the optical image of the source document must be of sufficient quality to allow the data extraction technology to identify and extract the individual characters and symbols represented in the optical image of the source document. There are many possible reasons why the optical image of a source document may not be of sufficient quality to allow the data extraction technology to identify and extract the individual characters and symbols including, but not limited to, bad/incorrect focus; the camera had focus lock, but was in motion; poor lighting conditions; poor print quality of the source document; a cropped image of the source document; and/or a skewed image of the source document.

Currently, significant delay and processing inefficiencies are incurred when the optical image of a source document is not of sufficient quality, and before a user is informed of the unacceptable quality of a captured optical image of a source document. This is largely due to the current practice of optically scanning the entire source document and then transferring the image data for the entire source document to a remote server for processing. Currently, only then is the user informed if the quality of a captured optical image of a source document is unacceptable; in which case the entire process must be repeated again.

As an example, currently, when mobile devices, such as smart phones, are used to obtain the optical image of a source document, the user typically has no indication as to the quality of the optical image captured until the entire optical image has been processed by one or more OCR processing computing systems. To make matters worse, these OCR processing computing systems are often remote systems, such as remote servers or other OCR devices, which must be accessed through a network connection, such as an Internet connection. As a result, the user must often wait significant amounts of time, and use significant processing power and transmission bandwidth, before the user is notified that the quality of an optical image is not high enough for processing. Once the user is finally notified, the user must then start the process over again with no assurance that the next captured image will be any better. Consequently, currently, the use of optical images and data extraction technology to obtain data can be a time consuming, frustrating, and highly inefficient process.

As an even more specific illustrative example, using currently available methods, when the optical image of the source document is a picture of check's front, the user has to wait until the remote image analysis server responds to determine whether the captured image is acceptable. This typically takes around 20 seconds. Then the same processing time is required to process the check's back side adding a total delay of more than 40 seconds; and this is if everything goes well. If any part of the check's front or back image data is not acceptable, the entire process must be repeated, in some cases multiple times. Clearly, this can be a frustrating and inefficient process for both the user and the check processor.

What is needed is a method and system for informing the user of potentially low quality optical image data without waiting for the entire optical image to be processed and/or transmitted.

SUMMARY

In accordance with one embodiment, a system and method for providing efficient feedback regarding captured optical image quality includes obtaining a source document. In one embodiment, an optical image of the source document is captured using an image capture device associated with a computing system. In one embodiment, two or more source document image test regions are then defined/determined, thus dividing the optical image of the source document into two or more distinct source document image test regions, each source document image test region representing only a portion of the entire optical image of the source document.

In one embodiment, an optical image scan is performed on each source document image test region to determine if there are identifiable alpha-numeric characters or symbols present. In one embodiment, if one or more of the source document image test regions are determined not to contain identifiable alpha-numeric characters, the captured optical image of the source document is determined to be of insufficient quality to identify and extract individual characters and symbols. In one embodiment, a recommendation is then made to re-capture an optical image of the source documents whose initial optical images were determined to be of insufficient quality to identify and extract individual characters and symbols.

BRIEF DESCRIPTION OF THE DRAWINGS

FIG. 6 shows a source document image of an invoice/bill with five test regions designated in accordance with one embodiment.

Figure 1:
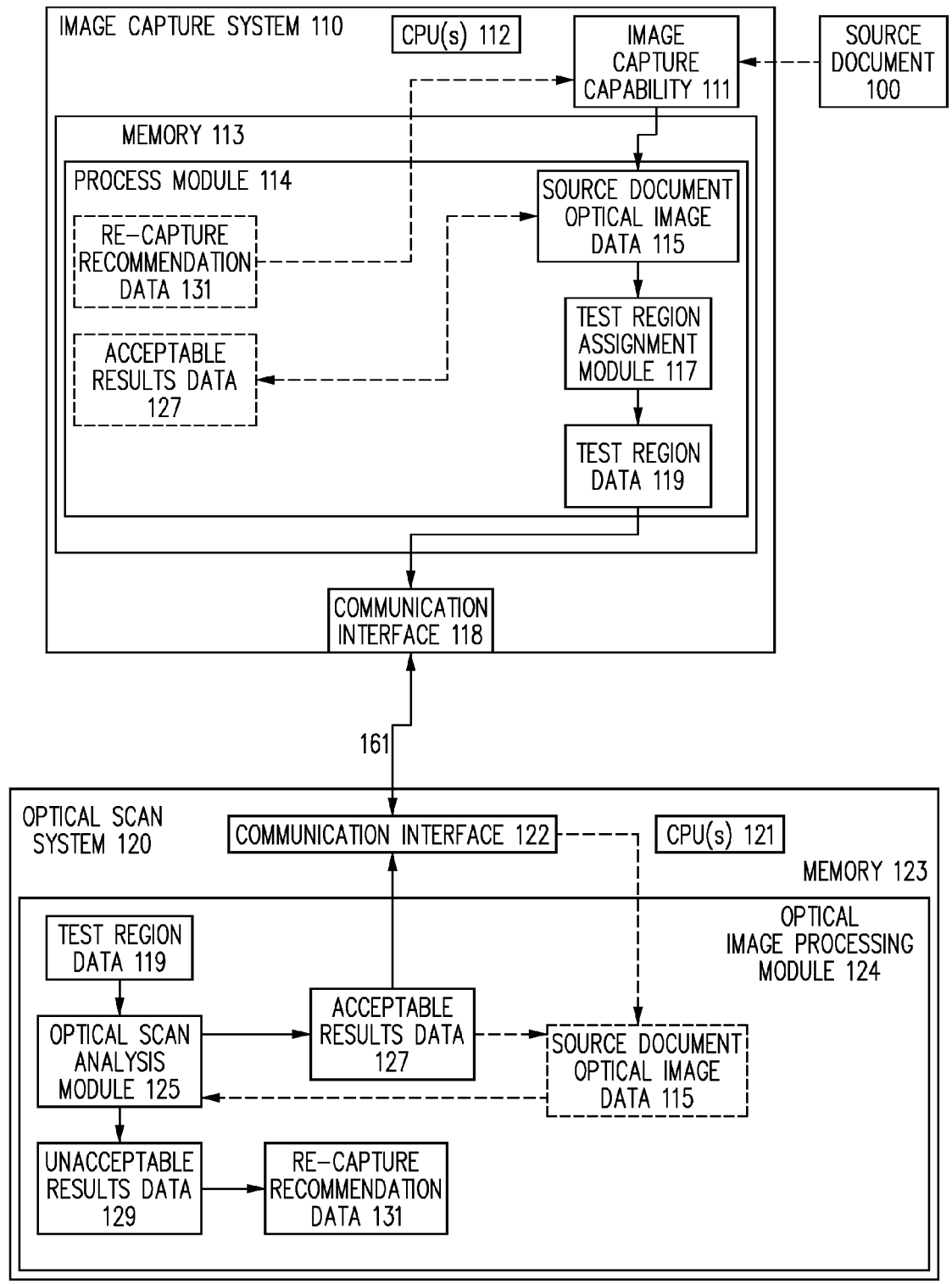
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "optical image data" includes data representing characters, symbols, text, visual images, and any other information or data obtained from a source document, or an image of a source document.

In one embodiment, a process for providing efficient feedback regarding captured optical image quality includes one or more applications, such as software packages, modules, or systems, implemented on one or more computing systems. In one embodiment, the computing system also includes an image capture device and/or function.

In one embodiment, the computing system is a mobile computing system such as a smart phone, or other mobile device, including an integrated camera function. However, as used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, a source document is provided and an image of the source document is captured using an image capture device, such as a camera associated with a computing system. In various embodiments, the source document can be any hard copy, or printed, document such as, but not limited to, a bill, an invoice, a bank statement, a credit card statement, a document associated with a financial transaction, a tax document, a warranty document, or any other hard copy or printed document, as discussed herein, and/or as known in the art at the time of filing, and/or as developed after the time of filing.

In accordance with one embodiment, the captured optical image of the source document is then divided into two or more distinct source document image test regions with each test region representing only a portion of the entire optical image of the source document.

In one embodiment, the one or more source document image test regions are determined by first determining the size of the source document, in one embodiment using edge detection technology, and then defining the source document image test regions.

In various embodiments, the number of source document image test regions is determined based, at least in part, on the resolution of the image capture device, such as a camera function implemented on the computing system, that will be used to capture an image of the source document.

In one embodiment, as a default, five distinct source document image test regions are defined with four of the source document image test regions being adjacent to the corners/edges of the optical image of the source document, and the fifth region being in the center, or in the body, of the optical image of the source document. In this embodiment, the four source document image test regions adjacent to the corners/edges of the optical image of the source document are chosen on the assumption that issues with the quality of the optical image of the source document are more likely to occur at the edges/corners of the optical image of the source document than in the body of the optical image of the source document.

In one embodiment, the location and/or number of source document image test regions is determined based on the type of source document. For example, if the source document is determined to be a receipt type of source document, the location and/or number of source document image test regions would be different than those required for a check type of source document, or an invoice type of source document.

In one embodiment, the location and/or number of source document image test regions is determined based on the type and source of the source document. For example, if the source document is determined to be a bill from a first vendor, the location and/or number of source document image test regions are defined differently than those for a bill from a second vendor, based on the observed formatting of the two vendors' bills.

As a more specific illustrative example, when the source document is a check issued in the United States, the source document image test regions will be the top left corner of the image of the check source document (test region 1), where name and address typically appear; the bottom left corner of the image of the check source document (test region 3), where the "FOR" field typically appears; the top right of the image of the check source document (test region 2), where check number typically appears; the bottom of the image of the check source document (test region 4), where MICR, or routing data, typically appears; and in the middle of the image of the check source document (test region 5), where the "Pay to the order of" field typically appears.

In one embodiment, once the source document image test regions are defined, an Optical Character Recognition (OCR) scan, or other similar scanning process, is performed on each defined test region to determine if the characters scanned in each defined test region can be identified as an alpha-numeric character or symbol.

In one embodiment, once the source document image test regions are defined, an OCR scan, or other similar scanning process, is performed on each of the four edge/corner source document image test regions first to determine if the characters scanned in each of the four edge/corner source document image test regions can be identified as an alpha-numeric character or symbol. As noted above, in one embodiment, this is done based on the assumption that issues with the quality of the optical image of the source document are more likely to occur at the edges/corners of the optical image of the source document than in the body of the optical image of the source document. Consequently, in one embodiment, four fast scans are performed on the source document image test regions of the optical image of the source documents where errors are most are most likely to occur instead of scanning the entire optical image of the source documents, as is done using prior art methods. Consequently, in one embodiment, the assumption is made that if all four fast scans performed on the source document image test regions of the optical image of the source documents are acceptable, i.e., are scanned accurately, then the entire optical image of the source document is probably of sufficient quality for OCR.

In one embodiment, if any of the source document image test regions are determined not to include identifiable alpha-numeric characters or symbols, it is assumed the optical image of the source document is not of high enough quality to identify and extract the individual characters and symbols represented in the optical image. Consequently, the user is advised to rescan the source document, i.e., re-capture the optical image of the source document.

In various embodiments, if no confidence information is available from the OCR system, the predicted quality of the document-wide optical image of the source document is based solely on the small scans performed on the source document image test regions of the optical image of the source document.

In other embodiments, where confidence information is available from the OCR system, the predicted quality of the document-wide optical image of the source document is based both on the small scans performed on the source document image test regions of the optical image of the source document and on the confidence of identified characters or symbols.

As noted above, there are many possible reasons why the optical image of a source document may not be of sufficient quality to allow the data extraction technology to identify and extract the individual characters and symbols including, but not limited to, bad/incorrect focus; the camera had focus lock, but was in motion; poor lighting conditions; poor print quality of the source document; a cropped image of the source document; and/or a skewed image of the source document. Consequently, in one embodiment, if the user is advised to rescan the source document, the second scan can be optimized by applying focus or exposure compensation in source document image test regions where the quality was found to be lacking.

As a specific illustrative example, assume a user captures an optical image, e.g., takes a picture, of a source document. In this specific illustrative example, five source document image test regions are defined within the source document image. As an example, four source document image test regions are adjacent to the four edges of the source document image, and the fifth region is the remaining part of the source document image. As noted above, in various other embodiments/examples, the source document image test regions are assigned based on the document type, for instance source document image test regions for a receipt type document would be different than those required for a check.

In this illustrative example, an abbreviated OCR is performed only on the four source document image test regions adjacent to the four edges of the source document image. In this illustrative example, each scanned test region is analyzed to determine if alpha-numeric data is present. In this illustrative example, if no alpha-numeric data is detected in any one of the four source document image test regions adjacent to the four edges of the source document image, it is assumed the optical image data is not of sufficient quality and the user is notified to rescan.

Using the method and system for providing efficient feedback regarding captured optical image quality, as discussed herein, the OCR scan process is initially abbreviated by splitting the source document into discrete source document image test regions and then initially scanning only the source document image test regions for image quality. Consequently, using the method and system for providing efficient feedback regarding captured optical image quality, as discussed herein, the user is informed of potentially low quality optical image data without waiting for the entire optical image to be processed and/or transmitted.

Hardware System Architecture

FIG. 1 is a block diagram of an exemplary hardware architecture for implementing one embodiment of a process for providing efficient feedback regarding captured optical image quality, such as exemplary process 200 (FIG. 2) discussed herein.

FIG. 1 includes source document 100, e.g., any hard copy, or printed, document; image capture system 110, i.e., a computing system including an image capture capability and implementing at least part of a process for providing efficient feedback regarding captured optical image quality; optical image scan system 120, e.g., a computing and/or server system implementing an optical scan/analysis capability, such as a OCR capability; operatively coupled by communications channel 161.

Source document 100 can be any hard copy, or printed, document such as, but not limited to, a bill, an invoice, a bank statement, a credit card statement, a document associated with a financial transaction, a tax document, a warranty document, or any other hard copy or printed document, as discussed herein, and/or as known in the art at the time of filing, and/or as developed after the time of filing.

As seen in FIG. 1, image capture system 110 includes image capture capability 111, e.g., a camera function; Central Processing Unit(s) 112, CPU(s) 112; memory 113 and communication interface 118. As seen in FIG. 1, memory 113 includes process module 114 including at least part of the components required to provide the functionality associated with a process for providing efficient feedback regarding captured optical image quality. In various embodiments, image capture system 110 is a mobile computing system such as a smart phone, or other mobile device, including an integrated camera function. However, in various embodiments, image capture system 110 can be any computing system as discussed herein, and/or as known in the art at the time of filing, and/or as developed after the time of filing.

As seen in FIG. 1 optical image scan system 120 includes Central Processing Unit(s) (CPUs 121), memory 123, and communications interface 122. As seen in FIG. 1, memory 123 includes optical image processing module 124 through which an optical scan capability, such as an OCR capability is provided. In various embodiments, optical image scan system 120 can be any computing system as discussed herein, and/or as known in the art at the time of filing, and/or as developed after the time of filing.

In one embodiment communication channel 161, can be, but is not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, when a user of image capture system 110 desires to capture an image of source document 100 for data extraction, the user activates image capture capability 111 on image capture system 110 (not shown), e.g., a picture is taken of source document 100 using a camera included in image capture system 110.

In one embodiment, image capture capability 111 then generates source document optical image data 115 including data representing source document 100.

In accordance with one embodiment, test region assignment module 117 the defines one or more source document image test regions within source document optical image data 115 of source document 100, with each source document image test region representing only a portion of the entire optical image of the source document.

In one embodiment, test region assignment module 117 defines the one or more source document image test regions by first determining the size of source document 100, in one embodiment using edge detection technology, and then assigning the source document image test regions.

In various embodiments, the number of source document image test regions is determined by test region assignment module 117 based, at least in part, on the resolution of image capture capability 111, such as a camera function, that will be used to capture an image of source document 100.

In one embodiment, as a default, test region assignment module 117 assigns five distinct source document image test regions with four of the source document image test regions being adjacent to the corners/edges of the optical image of the source document 100, and the fifth region being in the center, or in the body, of the optical image of the source document 100. In this embodiment, the four source document image test regions adjacent to the corners/edges of the optical image of the source document 100 are chosen on the assumption that issues with the quality of the optical image of the source document 100 are more likely to occur at the edges/corners of the optical image of the source document 100 than in the body of the optical image of source document 100.

In one embodiment, the location and/or number of source document image test regions is determined by test region assignment module 117 based on the type of source document. For example, if source document 100 is determined to be a receipt type of source document, the location and/or number of source document image test regions would be different than those required for a check type of source document 100, or an invoice type of source document 100.

In one embodiment, the location and/or number of source document image test regions is determined by test region assignment module 117 based on the type and source of the source document. For example, if source document 100 is determined to be a bill from a first vendor, the location and/or number of source document image test regions are defined differently than those for a bill from a second vendor, based on the observed formatting of the two vendors' bills.

In one embodiment, once the source document image test regions are defined by test region assignment module 117, the resulting test region data 119 representing the optical image data associated with the source document image test regions defined by test region assignment module 117, is transferred to optical scan system 120, in one embodiment, via communication interface 118, communications channel 161, and communication interface 122.

In one embodiment, at optical scan system 120 an Optical Character Recognition (OCR) scan, or other similar scanning process, is performed by optical scan analysis module 125 on each defined source document image test region of test region data 119 to determine if the characters scanned in each defined test region can be identified as an alpha-numeric character or symbol.

In one embodiment, if any of the source document image test regions of test region data 119 are determined not to include identifiable alpha-numeric characters or symbols, it is assumed the optical image of the source document 100, i.e., source document optical image data 115, is not of high enough quality to identify and extract the individual characters and symbols represented in the optical image of source document 100. Consequently, unacceptable results data 129 is generated and re-capture recommendation data 131 is generated advising a re-capture or rescan be made of source document 100.

In one embodiment, re-capture recommendation data 131 is then sent to image capture system 110 and process module 114. In one embodiment, image capture capability is then used to secure new source document optical image data 115.

In one embodiment, if all of the source document image test regions of test region data 119 are determined to include identifiable alpha-numeric characters or symbols, it is assumed the optical image of the source document 100, i.e., source document optical image data 115, is of high enough quality to identify and extract the individual characters and symbols represented in the optical image of source document 100. Consequently, acceptable results data 127 is generated.

In one embodiment, acceptable results data 127 is then sent to image capture system 110 and process module 114. In one embodiment, all of source document optical image data 115, i.e., optical image data representing the entire optical image of source document 100, is transferred to optical scan system 120, in one embodiment, via communication interface 118, communications channel 161, and communication interface 122, for optical image processing by optical scan analysis module 125.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a system and method for providing efficient feedback regarding captured optical image quality includes obtaining a source document. In one embodiment, an optical image of the source document is captured using an image capture device associated with a computing system. In one embodiment, two or more source document image test regions are then defined/determined, thus dividing the optical image of the source document into two or more distinct source document image test regions, each source document image test region representing only a portion of the entire optical image of the source document.

In one embodiment, an optical image scan is performed on each source document image test region to determine if there are identifiable alpha-numeric characters or symbols present. In one embodiment, if one or more of the source document image test regions are determined not to contain identifiable alpha-numeric characters, the captured optical image of the source document is determined to be of insufficient quality to identify and extract individual characters and symbols. In one embodiment, a recommendation is then made to re-capture an optical image of the source documents whose initial optical images were determined to be of insufficient quality to identify and extract individual characters and symbols.

Figure 2:
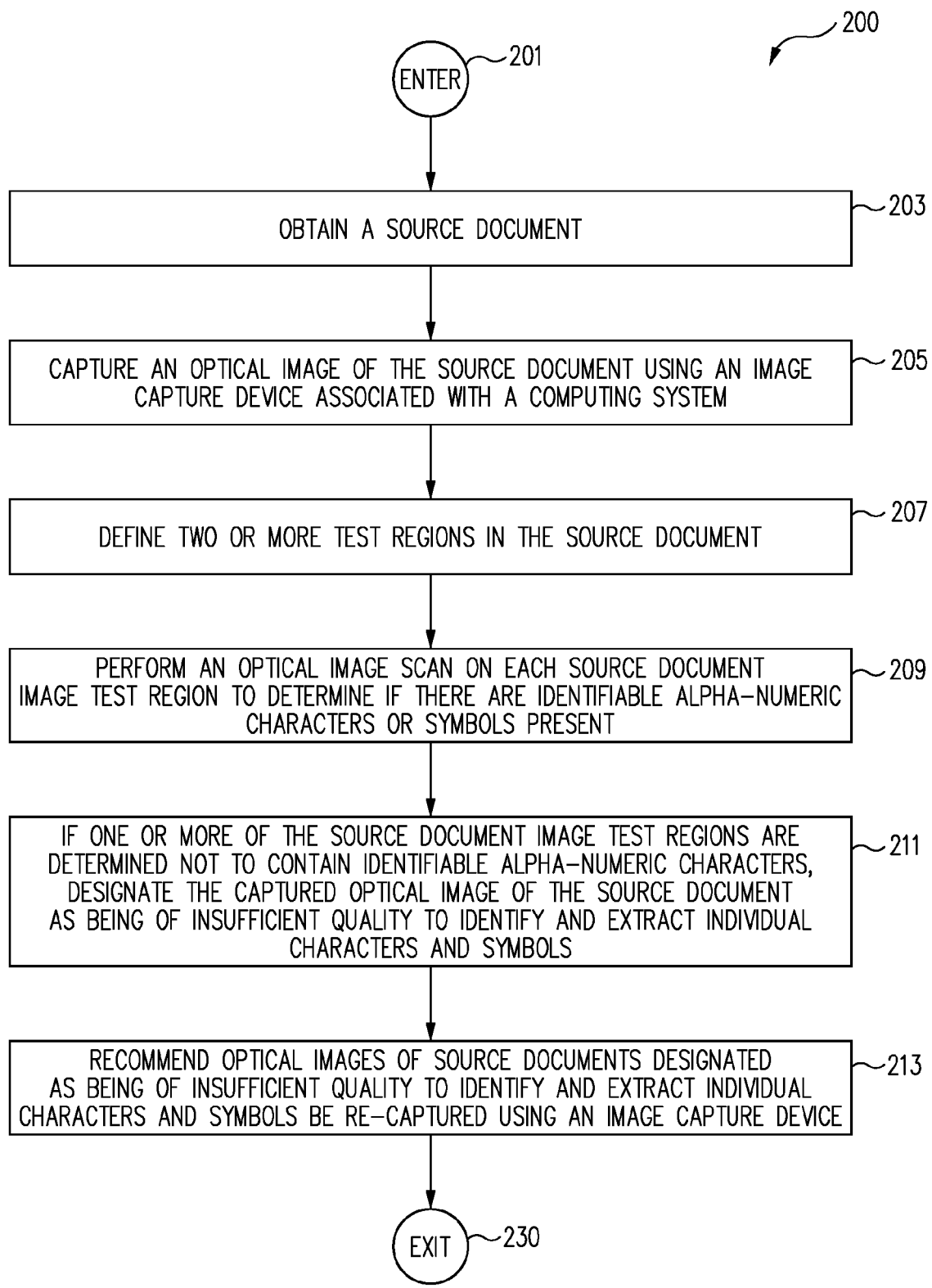
FIG. 2 is a flow chart depicting a process for providing efficient feedback regarding captured optical image quality in accordance with one embodiment.

FIG. 2 is a flow chart depicting a process 200 for providing efficient feedback regarding captured optical image quality in accordance with one embodiment.

Process 200 for providing efficient feedback regarding captured optical image quality begins at ENTER OPERATION 201 of FIG. 2 and process flow proceeds to OBTAIN A SOURCE DOCUMENT OPERATION 203.

In one embodiment, at OBTAIN A SOURCE DOCUMENT OPERATION 203 a source document is obtained and/or provided.

In various embodiments, the source document of OBTAIN A SOURCE DOCUMENT OPERATION 203 can be any hard copy, or printed, document such as, but not limited to, a bill, an invoice, a bank statement, a credit card statement, a document associated with a financial transaction, a tax document, a warranty document, or any other hard copy or printed document, as discussed herein, and/or as known in the art at the time of filing, and/or as developed after the time of filing.

In one embodiment, once a source document is obtained and/or provided at OBTAIN A SOURCE DOCUMENT OPERATION 203, process flow proceeds to CAPTURE AN OPTICAL IMAGE OF THE SOURCE DOCUMENT USING AN IMAGE CAPTURE DEVICE ASSOCIATED WITH A COMPUTING SYSTEM OPERATION 205.

In one embodiment, at CAPTURE AN OPTICAL IMAGE OF THE SOURCE DOCUMENT USING AN IMAGE CAPTURE DEVICE ASSOCIATED WITH A COMPUTING SYSTEM OPERATION 205, an image of the source document is captured using an image capture device, such as a camera associated with a computing system.

In one embodiment, once an image of the source document is captured using an image capture device, such as a camera associated with a computing system, at CAPTURE AN OPTICAL IMAGE OF THE SOURCE DOCUMENT USING AN IMAGE CAPTURE DEVICE ASSOCIATED WITH A COMPUTING SYSTEM OPERATION 205, process flow proceeds to DEFINE TWO OR MORE TEST REGIONS IN THE SOURCE DOCUMENT OPERATION 207.

In one embodiment, at DEFINE TWO OR MORE TEST REGIONS IN THE SOURCE DOCUMENT OPERATION 207 two or more distinct source document image test regions are defined with each test region representing only a portion of the entire optical image of CAPTURE AN OPTICAL IMAGE OF THE SOURCE DOCUMENT USING AN IMAGE CAPTURE DEVICE ASSOCIATED WITH A COMPUTING SYSTEM OPERATION 205, i.e., two or more distinct source document image test regions are defined with each test region representing only a portion of the entire optical image of the source document.

In one embodiment, at DEFINE TWO OR MORE TEST REGIONS IN THE SOURCE DOCUMENT OPERATION 207 the one or more source document image test regions are determined by first determining the size of the source document, in one embodiment using edge detection technology, and then defining the source document image test regions.

In various embodiments, the number of source document image test regions is determined at DEFINE TWO OR MORE TEST REGIONS IN THE SOURCE DOCUMENT OPERATION 207 based, at least in part, on the resolution of the image capture device, such as a camera function implemented on the computing system, that will be used to capture an image of the source document.

In one embodiment, as a default, five distinct source document image test regions are defined at DEFINE TWO OR MORE TEST REGIONS IN THE SOURCE DOCUMENT OPERATION 207 with four of the source document image test regions being adjacent to the corners/edges of the optical image of the source document, and the fifth region being in the center, or in the body, of the optical image of the source document. In this embodiment, the four source document image test regions adjacent to the corners/edges of the optical image of the source document are chosen on the assumption that issues with the quality of the optical image of the source document are more likely to occur at the edges/corners of the optical image of the source document than in the body of the optical image of the source document.

In one embodiment, the location and/or number of source document image test regions is determined at DEFINE TWO OR MORE TEST REGIONS IN THE SOURCE DOCUMENT OPERATION 207 based on the type of source document. For example, if the source document is determined to be a receipt type of source document, the location and/or number of source document image test regions would be different than those required for a check type of source document, or an invoice type of source document.

In one embodiment, the location and/or number of source document image test regions is determined at DEFINE TWO OR MORE TEST REGIONS IN THE SOURCE DOCUMENT OPERATION 207 based on the type and source of the source document. For example, if the source document is determined to be a bill from a first vendor, the location and/or number of source document image test regions are defined differently than those for a bill from a second vendor, based on the observed formatting of the two vendors' bills.

In one embodiment, once two or more distinct source document image test regions are defined with each test region representing only a portion of the entire optical image of CAPTURE AN OPTICAL IMAGE OF THE SOURCE DOCUMENT USING AN IMAGE CAPTURE DEVICE ASSOCIATED WITH A COMPUTING SYSTEM OPERA- TION 205 at DEFINE TWO OR MORE TEST REGIONS IN THE SOURCE DOCUMENT OPERATION 207, process flow proceeds to PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209.

In one embodiment, at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209 once the source document image test regions are defined at DEFINE TWO OR MORE TEST REGIONS IN THE SOURCE DOCUMENT OPERATION 207, an Optical Character Recognition (OCR) scan, or other similar scanning process, is performed on each defined test region to determine if the characters scanned in each defined test region can be identified as an alpha-numeric character or symbol.

In one embodiment, once the source document image test regions are defined, an OCR scan, or other similar scanning process, is performed at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209 on each of the four edge/corner source document image test regions first to determine if the characters scanned in each of the four edge/corner source document image test regions can be identified as an alpha-numeric character or symbol.

As noted above, in one embodiment, this is done based on the assumption that issues with the quality of the optical image of the source document are more likely to occur at the edges/corners of the optical image of the source document than in the body of the optical image of the source document. Consequently, in one embodiment, four fast scans are performed on the source document image test regions of the optical image of the source documents where errors are most are most likely to occur instead of scanning the entire optical image of the source documents, as is done using prior art methods. Consequently, in one embodiment, the assumption is made that if all four fast scans performed on the source document image test regions of the optical image of the source documents are acceptable, i.e., are scanned accurately, then the entire optical image of the source document is probably of sufficient quality for OCR.

In one embodiment, once an OCR scan, or other similar scanning process, is performed on each defined test region to determine if the characters scanned in each defined test region can be identified as an alpha-numeric character or symbol at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209, process flow proceeds to IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211.

In one embodiment, at IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211 if any of the source document image test regions of DEFINE TWO OR MORE TEST REGIONS IN THE SOURCE DOCUMENT OPERATION 207 are determined not to include identifiable alpha-numeric characters or symbols at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209, it is assumed the optical image of the source document is not of high enough quality to identify and extract the individual characters and symbols represented in the optical image.

In various embodiments, if no confidence information is available from the OCR system, the predicted quality of the document-wide optical image of the source document is determined at IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211 based solely on the small scans performed on the source document image test regions of the optical image of the source document.

In other embodiments, where confidence information is available from the OCR system, the predicted quality of the document-wide optical image of the source document is determined at IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211 based on both the small scans performed on the source document image test regions of the optical image of the source document and on the confidence of identified characters or symbols.

In one embodiment, once any of the source document image test regions determined not to include identifiable alpha-numeric characters or symbols is assumed to not be of high enough quality to identify and extract the individual characters and symbols represented in the optical image at IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211, process flow proceeds to RECOMMEND OPTICAL IMAGES OF SOURCE DOCUMENTS DESIGNATED AS BEING OF INSUFFICIENT QUALITY TO IDENTIFY AND EXTRACT INDIVIDUAL CHARACTERS AND SYMBOLS BE RE-CAPTURED USING AN IMAGE CAPTURE DEVICE OPERATION 213.

In one embodiment, at RECOMMEND OPTICAL IMAGES OF SOURCE DOCUMENTS DESIGNATED AS BEING OF INSUFFICIENT QUALITY TO IDENTIFY AND EXTRACT INDIVIDUAL CHARACTERS AND SYMBOLS BE RE-CAPTURED USING AN IMAGE CAPTURE DEVICE OPERATION 213 the user is advised to rescan any source document, i.e., re-capture the optical image of any source document determined not to include identifiable alpha-numeric characters or symbols and assumed not to be of high enough quality to identify and extract the individual characters and symbols represented in the optical image at IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211.

As noted above, there are many possible reasons why the optical image of a source document may not be of sufficient quality to allow the data extraction technology to identify and extract the individual characters and symbols including, but not limited to, bad/incorrect focus; the camera had focus lock, but was in motion; poor lighting conditions; poor print quality of the source document; a cropped image of the source document; and/or a skewed image of the source document. Consequently, in one embodiment, if the user is advised to rescan the source document at RECOMMEND OPTICAL IMAGES OF SOURCE DOCUMENTS DESIGNATED AS BEING OF INSUFFICIENT QUALITY TO IDENTIFY AND EXTRACT INDIVIDUAL CHARACTERS AND SYMBOLS BE RE-CAPTURED USING AN IMAGE CAPTURE DEVICE OPERATION 213, the second scan can be optimized by applying focus or exposure compensation in source document image test regions where the quality was found to be lacking.

In one embodiment, once the user is advised to rescan any source document, i.e., re-capture the optical image of any source document determined not to include identifiable alpha-numeric characters or symbols and assumed not to be of high enough quality to identify and extract the individual characters and symbols represented in the optical image at RECOMMEND OPTICAL IMAGES OF SOURCE DOCUMENTS DESIGNATED AS BEING OF INSUFFICIENT QUALITY TO IDENTIFY AND EXTRACT INDIVIDUAL CHARACTERS AND SYMBOLS BE RE-CAPTURED USING AN IMAGE CAPTURE DEVICE OPERATION 213, process flow proceeds to EXIT OPERATION 230.

In one embodiment, at EXIT OPERATION 230, process 200 for providing efficient feedback regarding captured optical image quality is exited to await new data.

Figure 3:
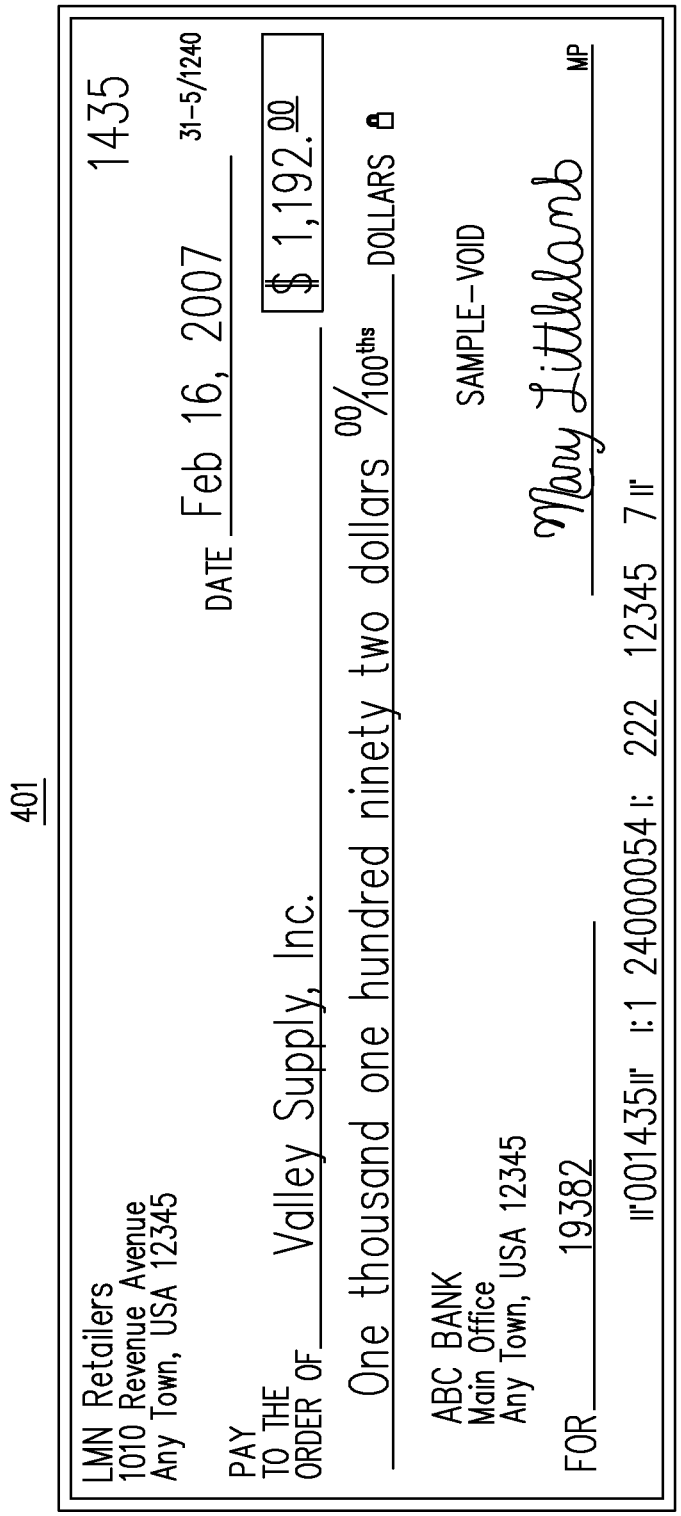
FIG. 3 shows a source document image of a check issued from a United States bank in accordance with one embodiment.

As a specific illustrative example of one implementation of process 200 for providing efficient feedback regarding captured optical image quality, FIG. 3 shows a source document image of a check 401 issued from a United States bank in accordance with one embodiment as would be obtained in one specific illustrative example at CAPTURE AN OPTICAL IMAGE OF THE SOURCE DOCUMENT USING AN IMAGE CAPTURE DEVICE ASSOCIATED WITH A COMPUTING SYSTEM OPERATION 205.

Figure 4:
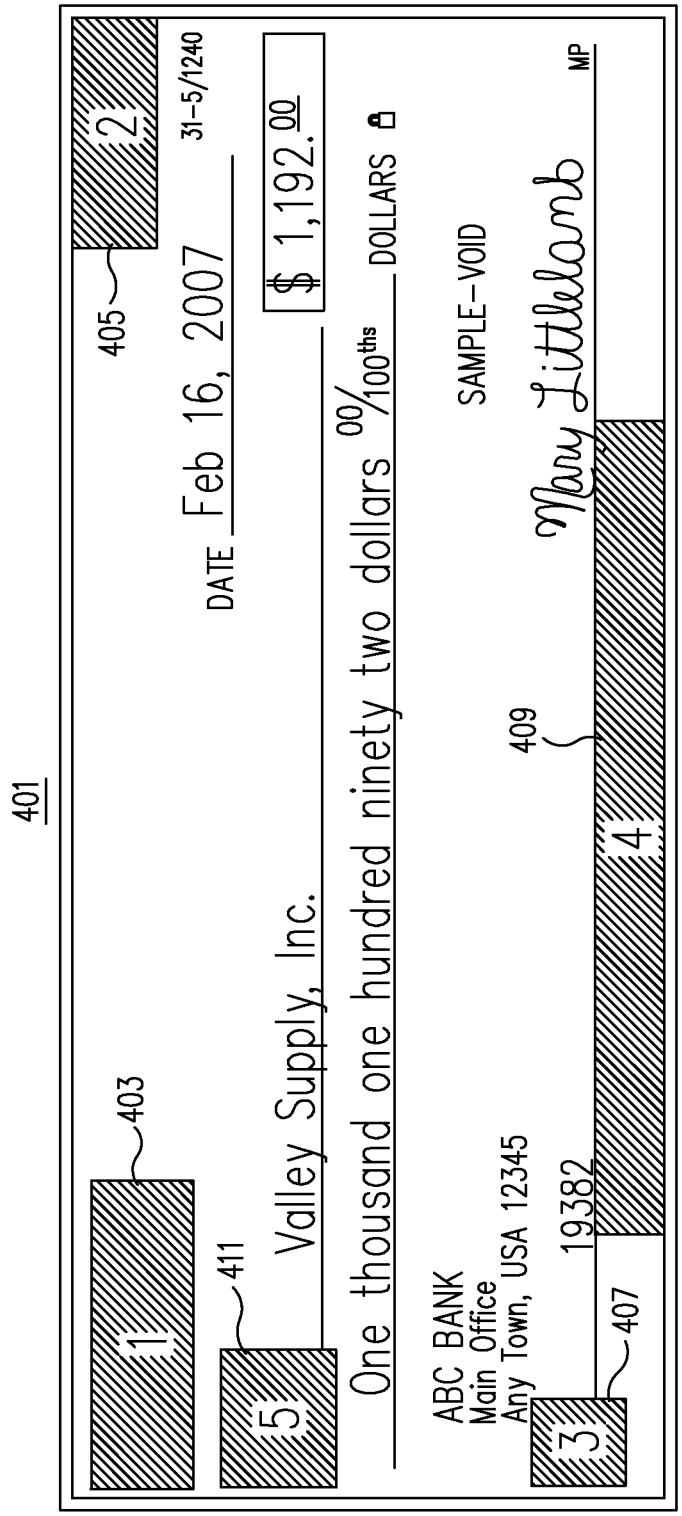
FIG. 4 shows the source document image of a check issued from a United States bank of FIG. 3 with five test regions designated in accordance with one embodiment.

FIG. 4 shows the source document image of a check 401 issued from a United States bank of FIG. 3 with five test regions defined at DEFINE TWO OR MORE TEST REGIONS IN THE SOURCE DOCUMENT OPERATION. As seen in FIG. 4, source document image test region 1, i.e., element 403 in FIG. 4, is located at the top left corner of the image of the check source document 401, where name and address data typically appear. As also seen in FIG. 4, source document image test region 2, i.e., element 405 in FIG. 4, is positioned in the top right of the image of the check source document 401, where check number typically appears. As also seen in FIG. 4, source document image test region 3, i.e., element 407 in FIG. 4, is located in the bottom left corner of the image of the check source document 401, where the "FOR" or "memo" field typically appears. In addition, source document image test region 4, i.e., element 409 in FIG. 4, is located at the bottom of the image of the check source document 401, where MICR, or routing data, typically appears. Finally, source document image test region 5, i.e., element 411 in FIG. 4, is positioned in the middle of the image of the check source document 401, where the "Pay to the order of" field typically appears.

In one embodiment, once the source document image test regions are defined, an OCR scan, or other similar scanning process, is performed at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209 on each of the source document image test regions 403, 405, 407, 409, and 411.

In one embodiment, once an OCR scan, or other similar scanning process, is performed on each defined test region 403, 405, 407, 409, and 411 to determine if the characters scanned in each defined test region can be identified as an alpha-numeric character or symbol at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209, process flow proceeds to IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211.

In one embodiment, at IF ONE OR MORE OF THE SOURCE DOCUMENT IMAGE TEST REGIONS ARE DETERMINED NOT TO CONTAIN IDENTIFIABLE ALPHA-NUMERIC CHARACTERS, DESIGNATE THE CAPTURED OPTICAL IMAGE OF THE SOURCE DOCUMENT AS BEING OF INSUFFICIENT QUALITY TO IDENTIFY AND EXTRACT INDIVIDUAL CHARACTERS AND SYMBOLS OPERATION 211 if any of the source document image test regions source document image test regions 403, 405, 407, 409, and 411 of DEFINE TWO OR MORE TEST REGIONS IN THE SOURCE DOCUMENT OPERATION 207 are determined not to include identifiable alpha-numeric characters or symbols at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209, it is assumed the optical image of the source document 401 is not of high enough quality to identify and extract the individual characters and symbols represented in the optical image.

In this case, at RECOMMEND OPTICAL IMAGES OF SOURCE DOCUMENTS DESIGNATED AS BEING OF INSUFFICIENT QUALITY TO IDENTIFY AND EXTRACT INDIVIDUAL CHARACTERS AND SYMBOLS BE RE-CAPTURED USING AN IMAGE CAPTURE DEVICE OPERATION 213, the user is advised to rescan, i.e., re-capture a new optical image of the check 401.

As noted above, in various embodiments, as a default, five distinct source document image test regions are defined at DEFINE TWO OR MORE TEST REGIONS IN THE SOURCE DOCUMENT OPERATION 207 with four of the source document image test regions being adjacent to the corners/edges of the optical image of the source document, and the fifth region being in the center, or in the body, of the optical image of the source document. In this embodiment, the four source document image test regions adjacent to the corners/edges of the optical image of the source document are chosen on the assumption that issues with the quality of the optical image of the source document are more likely to occur at the edges/corners of the optical image of the source document than in the body of the optical image of the source document.

Figure 5:
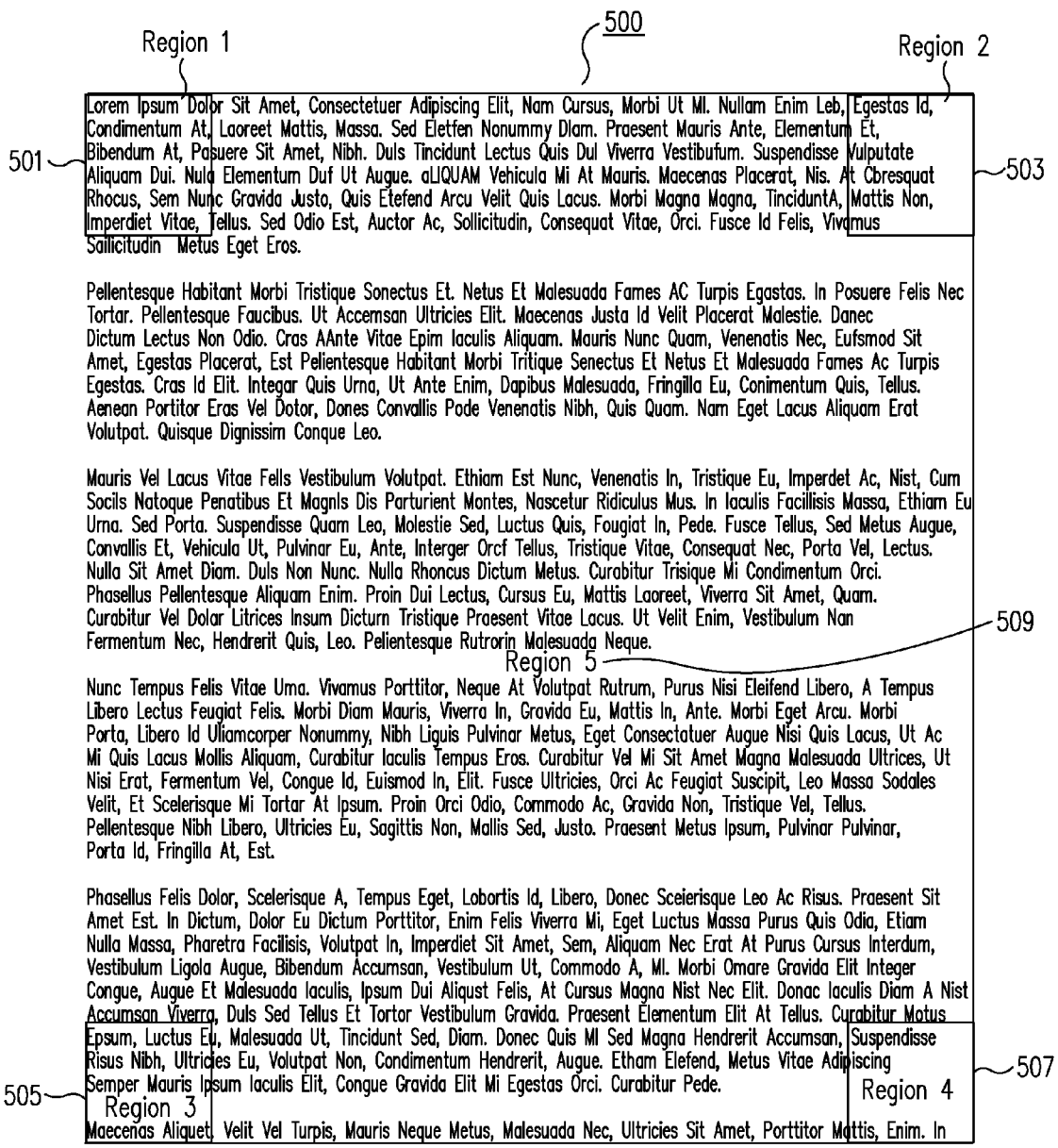
FIG. 5 shows a source document image of a text-based document with five test regions designated in accordance with one embodiment.

FIG. 5 shows a source document image of a text-based document 500 with five source document image test regions test regions, 501, 503, 505, 507, and 509 designated in accordance with another illustrative example of one embodiment.

As seen in FIG. 5, source document image test regions test regions, 501, 503, 505, and 507 are located at the corners of source document image of a text-based document 500. As noted above, in one embodiment, this is done based on the assumption that issues with the quality of the optical image of the source document are more likely to occur at the edges/corners of the optical image of the source document than in the body of the optical image of the source document.

Consequently, in one embodiment, at PERFORM AN OPTICAL IMAGE SCAN ON EACH SOURCE DOCUMENT IMAGE TEST REGION TO DETERMINE IF THERE ARE IDENTIFIABLE ALPHA-NUMERIC CHARACTERS OR SYMBOLS PRESENT OPERATION 209 four fast scans are performed on the source document image test regions 501, 503, 505, and 507 of source document image of a text-based document 500 where errors are most are most likely to occur instead of scanning the entire source document image of a text-based document 500, as is done using prior art methods. Consequently, in one embodiment, the assumption is made that if all four fast scans performed on source document image test regions 501, 503, 505, and 507 of source document image of a text-based document 500 are good, i.e., are scanned accurately, then the entire source document image of a text-based document 500 is probably of sufficient quality for OCR.

As also noted above, in one embodiment, the location and/or number of source document image test regions is determined at DEFINE TWO OR MORE TEST REGIONS IN THE SOURCE DOCUMENT OPERATION 207 based on the type of source document. As also noted, in one embodiment, the location and/or number of source document image test regions is determined based on the type and source of the source document. For example, if the source document is determined to be a bill from a first vendor, the location and/or number of source document image test regions are defined differently than those for a bill from a second vendor, based on the observed formatting of the two vendors' bills.

FIG. 6 shows a source document image of an invoice/bill 600 with five test regions designated in accordance with one embodiment. As seen in FIG. 6, source document image test region 601 is located in the upper left hand corner of source document image of an invoice/bill 600, where the return address data appears. As also seen in FIG. 6, source document image test region 603 is located in the lower right-hand corner of source document image of an invoice/bill 600 where the payment center address data appears. As also seen in FIG. 6, source document image test region 605 is located in the upper right-hand corner of source document image of an invoice/bill 600 where due date data appears. As also seen in FIG. 6, source document image test region 607 is located in the lower left-hand corner of source document image of an invoice/bill 600 where the billed party's address data appears. Finally, in this specific illustrative example, source document image test region 609 is located in the middle of source document image of an invoice/bill 600 where amount due data appears.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using the process 200 for providing efficient feedback regarding captured optical image quality discussed above, the optical scan process is initially abbreviated by splitting the source document into discrete source document image test regions and then scanning only the source document image test regions for image quality. Consequently, using process 200 for providing efficient feedback regarding captured optical image quality discussed above, the user is informed of potentially low quality optical image data without waiting for the entire optical image to be processed and/or transmitted.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing efficient feedback regarding captured optical image quality comprising the following, which when executed individually or collectively by any set of one or more processors perform a process including:
    obtaining a source document;
    capturing an optical image of the source document using an image capture device associated with a computing system;
    dividing the optical image of the source document into two or more distinct source document image test regions, each source document image test region representing only a portion of the entire optical image of the source document;
    performing individual and separate optical image scans on each source document image test region with regions of the source document optical image that are outside the source document test regions remaining unscanned;
    determining, through individual analyses of the individual and separate scans, that there are not any identifiable alpha-numeric characters or symbols present in at least one of the individual and separate scans;
    designating the captured optical image of the source document as being of insufficient quality to identify and extract individual characters and symbols;
    recommending that the optical image of the source document be re-captured using an image capture device;
    wherein the number of source document image test regions is determined based on the resolution of the image capture device.

2. The computing system implemented method for providing efficient feedback regarding captured optical image quality of claim 1 wherein the computing system is a mobile computing system and the image capture device is a mobile camera.

3. The computing system implemented method for providing efficient feedback regarding captured optical image quality of claim 1 wherein the computing system is a mobile phone and the image capture device is a mobile camera.

4. The computing system implemented method for providing efficient feedback regarding captured optical image quality of claim 1 wherein the source document is selected from the group of source documents consisting of:
    a hardcopy of a receipt;
    a hardcopy of a bill;
    a hardcopy of an invoice;
    a hardcopy of a financial account statement
    a hardcopy of any financial transaction related document;
    a hardcopy of a tax related document;
    a hardcopy of a warranty;
    a hardcopy of any document;
    a scanned of a receipt;
    a scanned of a bill;
    a scanned of an invoice;
    a scanned of a financial account statement
    a scanned of any financial transaction related document;
    a scanned of a tax related document;
    a scanned of a warranty; and
    a scanned of any document.

5. The computing system implemented method for providing efficient feedback regarding captured optical image quality of claim 1 wherein the number of source document image test regions is determined based on the type of source document.

6. The computing system implemented method for providing efficient feedback regarding captured optical image quality of claim 1 wherein the location of the source document image test regions is determined based on the type of source document.

7. The computing system implemented method for providing efficient feedback regarding captured optical image quality of claim 1 wherein the number of source document image test regions is five.

8. The computing system implemented method for providing efficient feedback regarding captured optical image quality of claim 1 wherein the optical image scan performed on each source document image test region to determine if there are identifiable alpha-numeric characters or symbols present is an Optical Image Recognition (OCR) scan.

9. The computing system implemented method for providing efficient feedback regarding captured optical image quality of claim 1 wherein recommending optical images of source documents designated as being of insufficient quality to identify and extract individual characters and symbols be re-captured using an image capture device includes recommending applying focus, skew, or exposure compensation in any source document image test region determined not to contain identifiable alpha-numeric characters.

10. A system for providing efficient feedback regarding captured optical image quality comprising:
  at least one processor; and
  at least one memory coupled to the at least one processor, the at least one memory having stored therein instructions which when executed by any set of the one or more processors, perform a process for providing efficient feedback regarding captured optical image quality including:
  obtaining a source document;
  capturing an optical image of the source document using an image capture device associated with a computing system;
  dividing the optical image of the source document into two or more distinct source document image test regions, each source document image test region representing only a portion of the entire optical image of the source document;
  performing individual and separate optical image scans on each source document image test region with regions of the source document optical image that are outside the source document test regions remaining unscanned;
  determining, through individual analyses of the individual and separate scans, that there are not any identifiable alpha-numeric characters or symbols present in at least one of the individual and separate scans;
  designating the captured optical image of the source document as being of insufficient quality to identify and extract individual characters and symbols;
  recommending that the optical image of the source document be re-captured using an image capture device;
  wherein the number of source document image test regions is determined based on the resolution of the image capture device.

11. The system for providing efficient feedback regarding captured optical image quality of claim 10 wherein the computing system is a mobile computing system and the image capture device is a mobile camera.

12. The system for providing efficient feedback regarding captured optical image quality of claim 10 wherein the computing system is a mobile phone and the image capture device is a mobile camera.

13. The system for providing efficient feedback regarding captured optical image quality of claim 10 wherein the source document is selected from the group of source documents consisting of:
  a hardcopy of a receipt;
  a hardcopy of a bill;
  a hardcopy of an invoice;
  a hardcopy of a financial account statement
  a hardcopy of any financial transaction related document;
  a hardcopy of a tax related document;
  a hardcopy of a warranty;
  a hardcopy of any document;
  a scanned of a receipt;
  a scanned of a bill;
  a scanned of an invoice;
  a scanned of a financial account statement
  a scanned of any financial transaction related document;
  a scanned of a tax related document;
  a scanned of a warranty; and
  a scanned of any document.

14. The system for providing efficient feedback regarding captured optical image quality of claim 10 wherein the number of source document image test regions is determined based on the type of source document.

15. The system for providing efficient feedback regarding captured optical image quality of claim 10 wherein the location of the source document image test regions is determined based on the type of source document.

16. The system for providing efficient feedback regarding captured optical image quality of claim 10 wherein the number of source document image test regions is five.

17. The system for providing efficient feedback regarding captured optical image quality of claim 10 wherein the optical image scan performed on each source document image test region to determine if there are identifiable alpha-numeric characters or symbols present is an Optical Image Recognition (OCR) scan.

18. The system for providing efficient feedback regarding captured optical image quality of claim 10 wherein recommending optical images of source documents designated as being of insufficient quality to identify and extract individual characters and symbols be re-captured using an image capture device includes recommending applying focus, skew, or exposure compensation in any source document image test region determined not to contain identifiable alpha-numeric characters.

19. A system for providing efficient feedback regarding captured optical image quality comprising:
  at least one processor; and
  at least one memory coupled to the at least one processor, the at least one memory having stored therein instructions which when executed by any set of the one or more processors, perform a process for providing efficient feedback regarding captured optical image quality including:
  obtaining a source document;
  capturing an optical image of the source document using an image capture device associated with a computing system;
  dividing the optical image of the source document into at least four distinct source document image test regions with four of the at least four distinct source document image test regions each being located adjacent to different corners of the optical image of the source document;

performing individual and separate optical image scans on each source document image test region with regions of the source document optical image that are outside the source document test regions remaining unscanned;

determining, through individual analyses of the individual and separate scans, that there are not any identifiable alpha-numeric characters or symbols present in at least one of the individual and separate scans;

designating the captured optical image of the source document as being of insufficient quality to identify and extract individual characters and symbols;

recommending that the optical image of the source document be re-captured using an image capture device;

wherein the number of source document image test regions is determined based on the resolution of the image capture device.

* * * * *